(12) United States Patent
Martin et al.

(10) Patent No.: US 7,697,951 B1
(45) Date of Patent: Apr. 13, 2010

(54) SYSTEM AND METHOD FOR DISTRIBUTED DISPATCH TRANSLATION GATEWAYS

(75) Inventors: David Martin, Chantilly, VA (US); Ojas T. Choksi, Herndon, VA (US); Frank Chu, Mountain View, CA (US); Corey Gates, Mountain View, CA (US)

(73) Assignee: Nextel Communications Inc., Reston, VA (US)

( * ) Notice: Subject to any disclaimer, the term of this patent is extended or adjusted under 35 U.S.C. 154(b) by 1024 days.

(21) Appl. No.: 11/409,065

(22) Filed: Apr. 24, 2006
(Under 37 CFR 1.47)

Related U.S. Application Data

(60) Provisional application No. 60/674,308, filed on Apr. 25, 2005.

(51) Int. Cl.
*H04B 7/00* (2006.01)
(52) U.S. Cl. ............... 455/519; 455/521; 455/552.1; 455/456.1; 455/432.1; 455/432.2; 455/406

(58) Field of Classification Search ............. 455/432.1, 455/432.2, 516, 518, 519, 524, 521, 406, 455/456.1, 552.1
See application file for complete search history.

(56) References Cited

U.S. PATENT DOCUMENTS

| 7,054,302 | B2 * | 5/2006 | Albal et al. | .............. 370/347 |
| 7,328,042 | B2 * | 2/2008 | Choksi | ................. 455/552.1 |

* cited by examiner

*Primary Examiner*—Temica M Beamer

(57) ABSTRACT

A system and method for translating dispatch communications between networks which operate according to different dispatch communication formats are provided. A communication system includes a dispatch translation network that translates dispatch communications between different dispatch communication networks. The dispatch translation network includes two or more dispatch translation gateways coupled to dispatch communication networks, the dispatch translation gateways perform signaling protocol and media translation for dispatch communications between the dispatch communication networks.

8 Claims, 4 Drawing Sheets

SYSTEM AND METHOD FOR DISTRIBUTED DISPATCH TRANSLATION GATEWAYS

This application claims priority under 35 U.S.C. §119 to U.S. Provisional Application No. 60/674,308, filed Apr. 25, 2005, the entire disclosure of which is herein expressly incorporated by reference.

BACKGROUND OF THE INVENTION

Cellular communications systems typically provide interconnect and/or dispatch voice communication services. Interconnect voice communication services are full-duplex and are typically provided by most cellular or wireless carriers as circuit-switched communications. Dispatch communication services are half-duplex and are commonly known as a walkie-talkie or push-to-talk type of calls such as Sprint Nextel's service identified by the trade name Direct Connect. Interconnect voice communication services provided by most cellular carriers can be provided between sources and destinations of different cellular carriers. However, dispatch communication services are typically implemented in a proprietary manner, which prevents dispatch calls from originating in one cellular carrier's network and terminating in another cellular carrier's network.

SUMMARY OF THE INVENTION

FIG. 1 illustrates an exemplary system for facilitating dispatch communications between different cellular carrier networks. The illustrated system provides a dispatch translation network 105 for facilitating dispatch communications between mobile stations (not illustrated) located in networks supported by Carriers A-C. The dispatch translation network 105 includes a dispatch translation gateway 110 and other dispatch translation components 115. The dispatch translation gateway 110 provides signaling protocol and media translation, service discovery, and name mapping functionality. The other dispatch translation network components 115 include root domain name, billing reconciliation, roaming, name translation, and location server functionalities.

Each carrier's system includes a central network. The central networks include a billing server, an authentication, authorization and accounting (AAA) server, and a group directory. The billing server handles the billing of subscriber's for usage of the carrier's network(s). The AAA server provides authentication, authorization and accounting services for a carrier's network(s). The group directory is similar to a home location register (HLR) or visitor location register (VLR), in that it contains subscription and location information for mobile stations supported by the carrier. Although the system of FIG. 1 illustrates Carrier A supporting three networks that operate according to three different dispatch communication formats, Carrier A can operate less than three networks. Moreover, Carrier's B and C can support networks of the same dispatch communication format and/or more than one network of different dispatch communication formats.

When a dispatch call is initiated from one carrier's network for a destination in another carrier's network, the call is routed to the dispatch translation network 105. An originating network, by consulting its central network group directory, determines that the destination is not located in its network (either by the absence of a subscriber record, or by a subscriber record that indicates the subscriber is located in a different network), and forwards the call to the dispatch translation network 105. The dispatch translation network 105 determines the current location of the destination (by either a record indicating that the subscriber is located in a particular network or by the destination identification included in the call request), performs any necessary signaling protocol and media translation, and forwards the call request to the network where the destination is currently located.

Although a dispatch translation network with a single dispatch translation gateway facilitates dispatch communication between networks of different carriers, the use of a single dispatch communication gateway has a number of deficiencies. For example, if the dispatch translation gateway fails, all inter-carrier dispatch communications will fail. Additionally, as dispatch communication traffic increases, it may be difficult to increase the capacity of a single centralized dispatch translation gateway to support the increased traffic, i.e., it is not easily scalable. Moreover, if the carriers' networks are located in different countries, latency will be introduced into the dispatch communications. Because reduced latency is one of the advantages of dispatch communications, compared to interconnect communications, maintaining reduced latency in dispatch communications is highly desirable.

A system and method for routing dispatch communications between networks which operate according to different dispatch communication formats are provided. A communication system includes a first dispatch communication network, which operates according to a first dispatch communication format, and a second dispatch communication network, which operates according to a second dispatch communication format. The system also includes a dispatch translation network.

The dispatch translation network includes a first dispatch translation gateway coupled to the first dispatch communication network, and a second dispatch translation gateway coupled to the second dispatch translation network. The dispatch translation gateways perform signaling protocol and media translation for dispatch communications between the first and second dispatch communication networks.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
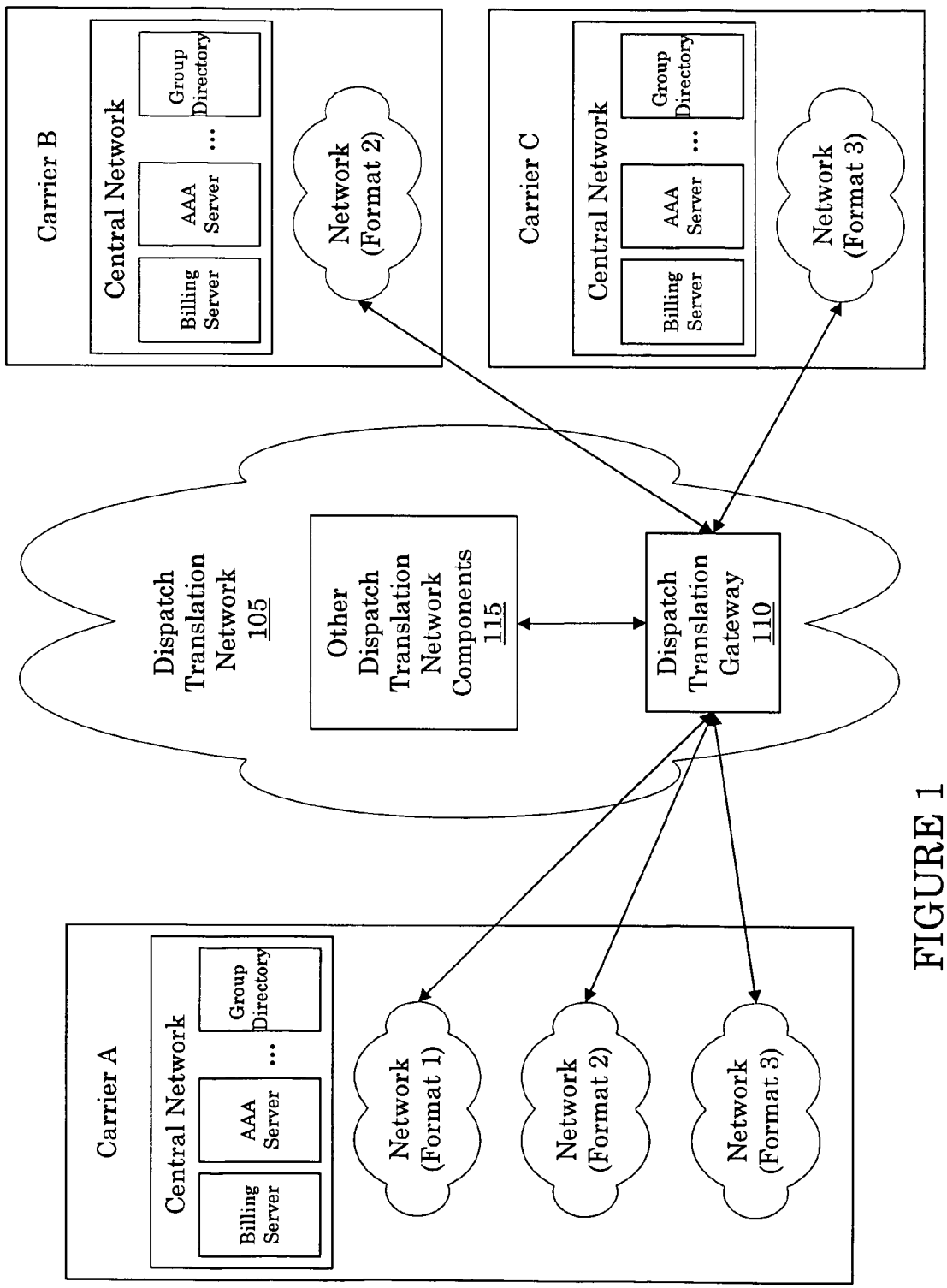
FIG. 1 illustrates an exemplary communication system.
Figure 2:
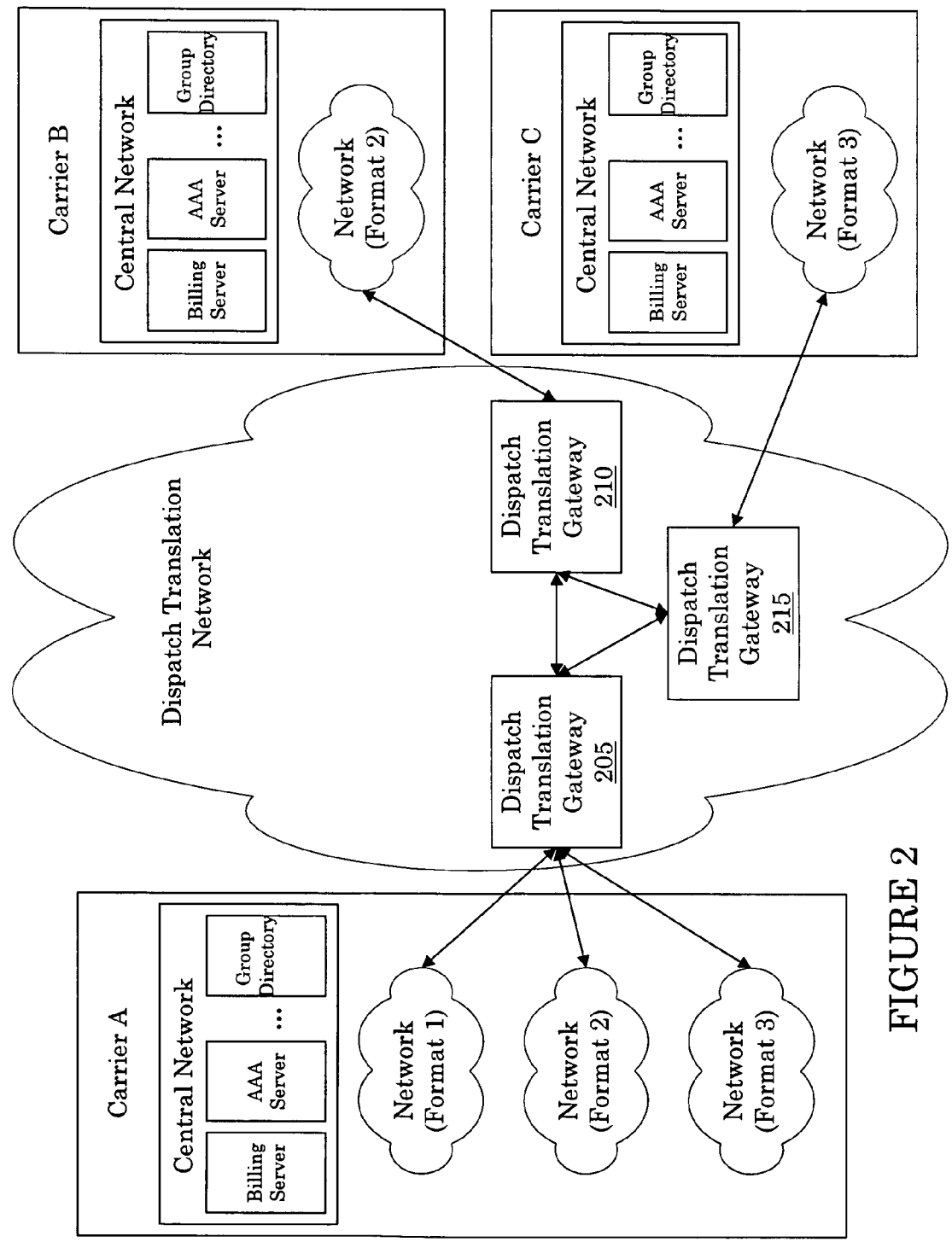
FIG. 2 illustrates an exemplary communication system in accordance with one embodiment of the present invention.

FIG. 2 illustrates an exemplary communication system in accordance with one embodiment of the present invention. For ease of explanation, and not limitation, the dispatch translation network in FIG. 2 does not illustrate the other dispatch translation network components. However, as will be recognized by those skilled in the art, each of the dispatch translation gateways is coupled to the other dispatch translation network components, as necessary, to support inter-carrier dispatch communications.

As illustrated in FIG. 2, this embodiment provides a dispatch translation gateway 205-215 for each carrier. Accordingly, if the dispatch translation gateway serving Carrier A fails, inter-carrier dispatch communications can still be supported between Carriers B and C.

Figure 3:
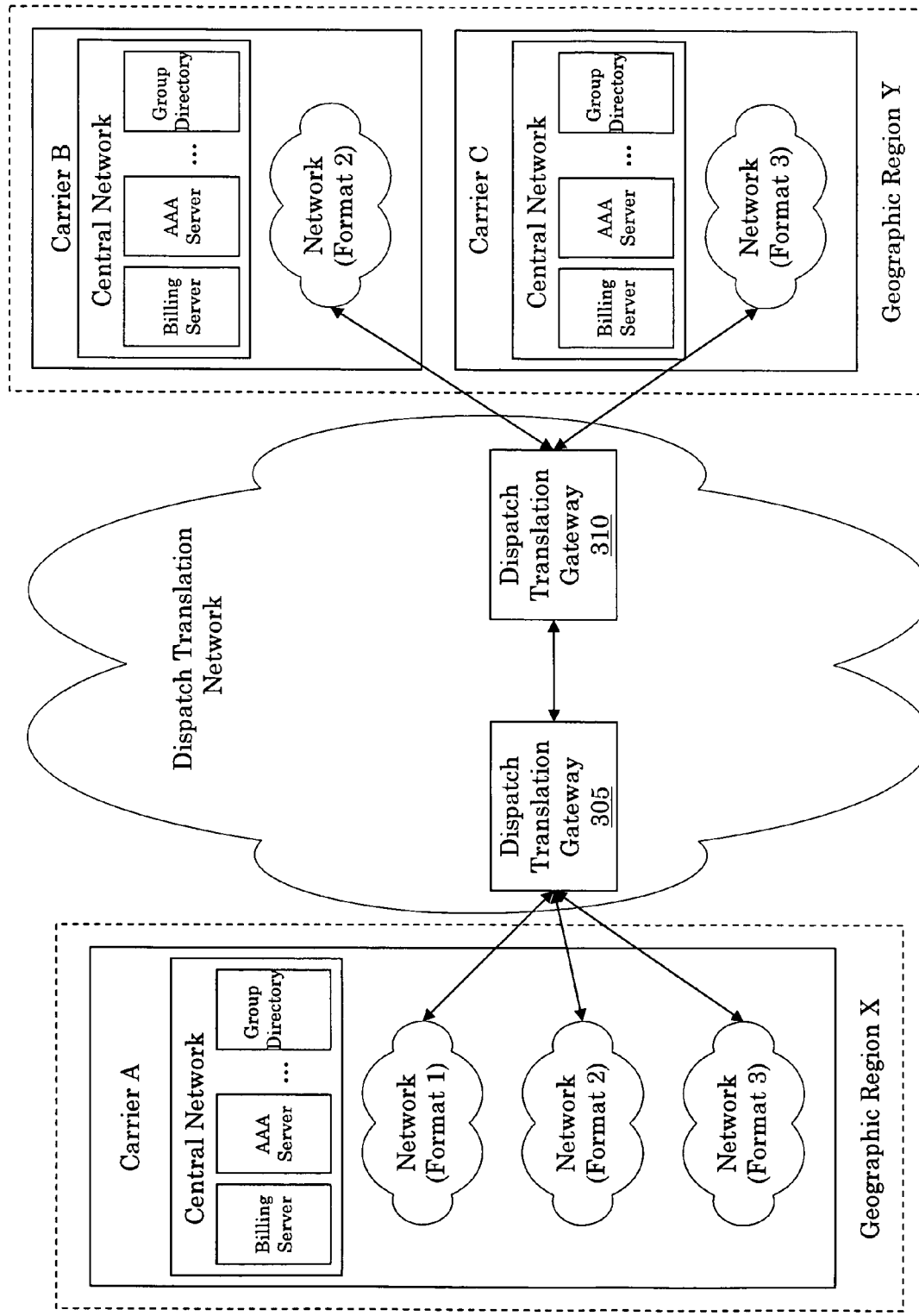
FIG. 3 illustrates an exemplary communication system in accordance with another embodiment of the present invention.

FIG. 3 illustrates an exemplary communication system in accordance with another embodiment of the present invention. For ease of explanation, and not limitation, the dispatch translation network in FIG. 3 does not illustrate the other dispatch translation network components. However, as will be recognized by those skilled in the art, each of the dispatch translation gateways is coupled to the other dispatch translation network components, as necessary, to support inter-carrier dispatch communications.

In accordance with the embodiment illustrated in FIG. 3, a dispatch translation gateway is provided to support different geographic regions. Specifically, Carrier A, located in geographic region X, is supported by dispatch translation gateway 305, while Carrier's B and C, located in geographic region Y, are supported by dispatch translation gateway 310. The geographic regions can correspond to countries, continents, or any other type of geographic region. Of course, for carriers located in more than one geographic region, a separate dispatch translation gateway can be allocated to those portions of the carrier's network in each geographic area. This embodiment can reduce latency for inter-carrier dispatch communications, when such communications occur between different carrier's located in the same geographic region. Additionally, this embodiment can reduce latency for intra-carrier dispatch communications, when communications occur between dispatch networks which operate according to different media and/or signaling protocols. Moreover, if a dispatch translation gateway for one geographic region fails, inter-carrier dispatch communications can still be provided between other geographic regions.

Although FIG. 3 illustrates only two geographic regions, more than two geographic regions can be provided. The additional geographic regions can be supported by different dispatch translation gateways from that of the two illustrated geographic regions.

Figure 4:
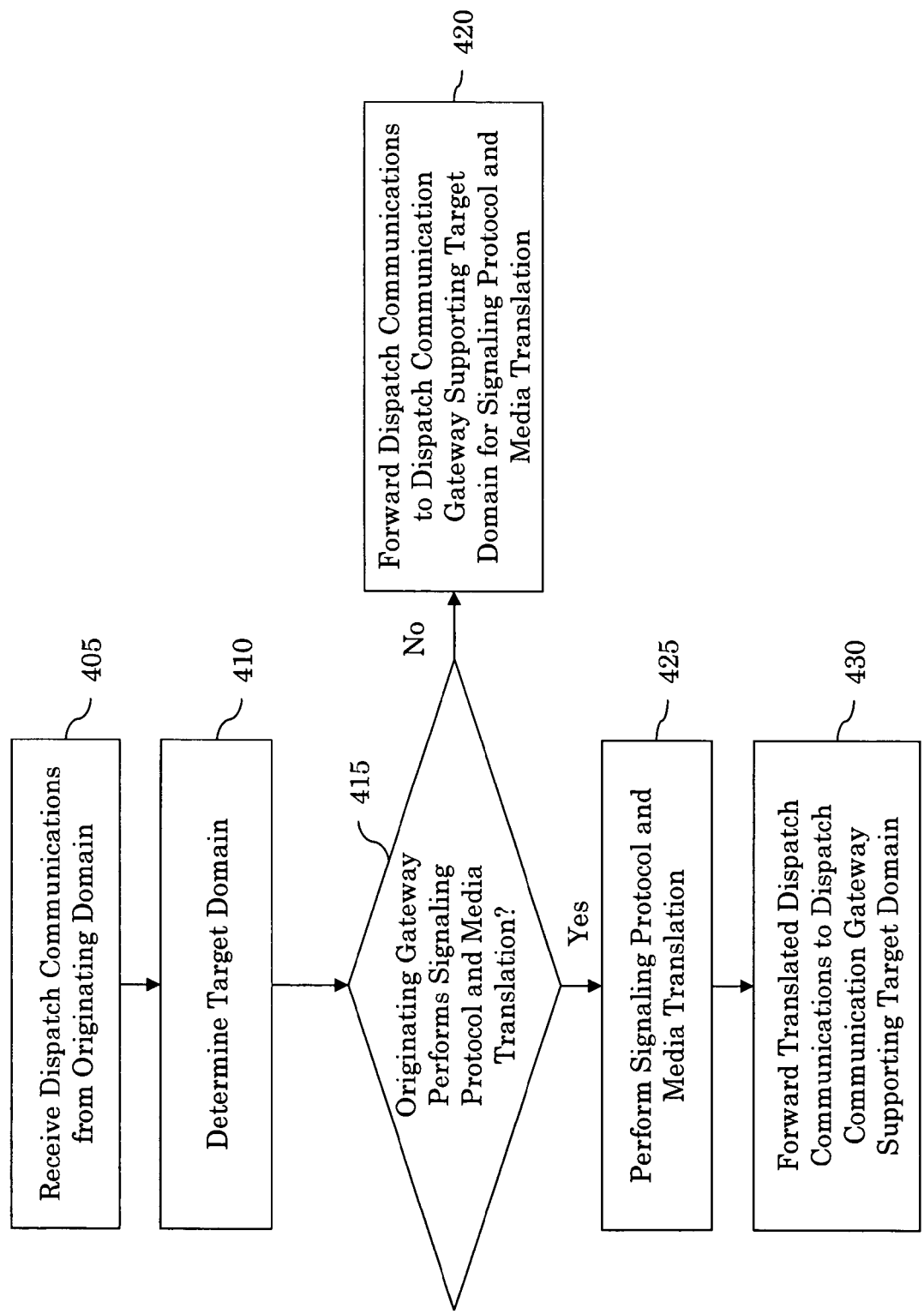
FIG. 4 illustrates an exemplary method for a dispatch translation network in accordance with the present invention.

FIG. 4 illustrates an exemplary method for a dispatch translation network in accordance with the present invention. This method is equally applicable to the systems illustrated in FIGS. 2 and 3. When a dispatch translation gateway receives a dispatch communication (step 405), the dispatch translation gateway determines the target domain of the dispatch communication request by comparing information in the dispatch communication request to a routing table (step 410). Specifically, the dispatch communication request will contain an indication of the top level domain of the destination network. This indication can be explicit, such as when the dispatch communication request includes a destination address such as destination@carrier.com. The indication can also be implicit. For example, the iDEN network uses an urban, fleet, mobile identifier (UFMI). UFMI addresses can be distributed in particular ranges depending upon the particular destination. The following table illustrates an exemplary routing table for translating UFMIs to top level domains:

| UFMI Low | UFMI High | Top Level Domain |
| --- | --- | --- |
| 222*100 | 222*1000 | CarrierA.com |
| ... | ... | ... |
| 333*1 | 333*55 | CarrierB.com |

In the chart above, UFMI Low and High represent the low and high ends of a UFMI range, respectively. The table is necessary because iDEN networks only support UFMIs as destination identifiers, while other networks may support conventional internet-type addresses, such as destination@carrier.com. Assuming that Carrier's B and C support the conventional internet-type addresses, dispatch communications which originate in one of these networks but are destined for the other will not need to consult this table.

After the originating dispatch translation gateway determines the target domain of the dispatch communication request, the dispatch translation gateway determines whether it performs the protocol and media translation (step 415). Specifically, each dispatch translation gateway is configured with a list of domains for which it handles protocol and media translation. In the systems illustrated in FIGS. 2 and 3, the dispatch translation gateway which supports Carrier A will be responsible for performing protocol and media translation between the different networks supported by Carrier A. As an alternative to, or in addition to, determining which dispatch translation handles protocol and media translation based on the destination domain, this determination can be based on the format of the originating and/or destination networks, ranges of callable numbers associated with the originating or destination mobile station (e.g., UFMI ranges), and the like. Moreover, the dispatch translation gateways can determine which gateway handles media and protocol conversion by the relative load being handled by each gateway to thereby perform load balancing between the gateways.

If the originating dispatch translation gateway determines that it does not handle protocol and media translation for a dispatch communication request ("No" path out of decision step 415), then the dispatch communication request is forwarded to the dispatch translation gateway supporting the target domain for protocol and media translation (step 420).

As an alternative to using one dispatch translation gateway to perform protocol and media translation, each dispatch translation gateway can translate the signaling protocol and media into an interworking signaling protocol, such as session initiation protocol (SIP) or the like, and an interworking media such as real-time protocol (RTP). Accordingly, the dispatch translation gateways would provide the dispatch communications to each other in the interworking protocol and media, and then convert it into the appropriate format for the destination network.

When a dispatch translation gateway determines that it performs signaling protocol and media translation ("Yes" path out of decision step 415), the dispatch translation gateway consults the following table to determine the destination format:

| UFMI Low | UFMI High | Local Domain or IP | Type |
| --- | --- | --- | --- |
| 222*100 | 222*199 | East.carrier1.com | iDEN |
| 222*200 | 222*299 | West.Carrier1.com | iDEN |
| 222*300 | 222*599 | TechnologyX.Carrier1.com | Technology X |

The exemplary table above is used by a dispatch translation gateway which supports an iDEN network and a dispatch network which operates according to another dispatch technology. If the dispatch translation gateway supports only dispatch technologies other than iDEN, the first two columns of the table will be omitted.

The system of the present invention can also provide dispatch translation gateway redundancy, such that if a primary dispatch translation gateway fails, dispatch communications are routed to a backup dispatch translation gateway. In addition, the present invention can provide a federated management interface. For example, multiple dispatch translation gateways can be managed from a single web interface. Moreover, the management interface allows management of global routing tables. Additionally, the management interface allows viewing statistics and other information regarding specific dispatch translation gateways.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A dispatch translation network comprising:
    a first dispatch translation gateway coupled to a first dispatch communication network, the first dispatch communication network operating according to a first dispatch communication format; and
    a second dispatch translation gateway coupled to the first dispatch translation gateway and a second dispatch translation network, the second dispatch communication network operating according to a second dispatch communication format,
    wherein dispatch communications between dispatch communication stations of the first and second dispatch communication networks are sent through the first and second dispatch translation gateways,
    wherein the first and second dispatch communication formats are different formats and the first dispatch translation gateway determines whether it translates the dispatch communications based on
        a format of the first or second dispatch communication network,
        a callable number associated with an originating or destination mobile station,
        whether the first dispatch translation gateway is directly coupled to the target dispatch communication network,
        a relative load between the first and second dispatch translation gateways, or
        a target domain of the dispatch communications.

2. The dispatch translation network of claim 1, wherein the first dispatch communication format includes signaling and media protocols.

3. The dispatch translation network of claim 1, further comprising:
    root domain name server, billing reconciliation server, roaming server, name translation server, or location server.

4. The dispatch translation network of claim 1, further comprising:
    a third dispatch translation gateway coupled to the first and second dispatch translation gateways and to a third dispatch communication network.

5. The dispatch translation network of claim 1, wherein the first dispatch communication network is operated by a first carrier and the second dispatch communication network is operated by a second carrier.

6. The dispatch translation network of claim 1, wherein the first and second dispatch communication networks are located in different geographic locations.

7. A method for translating dispatch communications between a first and second dispatch communication network, the method comprising the acts of:
    receiving, by a first dispatch translation gateway, dispatch communications from the first dispatch communication network;
    transmitting, by the first dispatch translation gateway to a second dispatch translation gateway, the dispatch communications; and
    transmitting, by the second dispatch communication gateway, the dispatch communications to the second dispatch communications network,
    wherein the first and second dispatch communication networks employ different dispatch communication formats and the first dispatch translation gateway determines whether it translates the dispatch communications based on
        a format of the first or second dispatch communication network
        a callable number associated with an originating or destination mobile station,
        whether the first dispatch translation gateway is directly coupled to the target dispatch communication network,
        a relative load between the first and second dispatch translation gateways, or
        a target domain of the dispatch communications,
    wherein the dispatch communications are translated by the first or second dispatch translation gateway.

8. A method for translating dispatch communications between a first and second dispatch communication network, the method comprising the acts of:
    receiving, by a first dispatch translation gateway, dispatch communications from the first dispatch communication network;
    transmitting by the first dispatch translation gateway to a second dispatch translation gateway the dispatch communications;
    transmitting by the second dispatch communication gateway, the dispatch communications to the second dispatch communications network,
    wherein the dispatch communications are translated by the first or second dispatch translation gateway,
    determining by the first dispatch translation gateway whether it translates the dispatch communications, wherein the first dispatch translation gateway determines whether it translates the dispatch communications based on a relative load between the first and second dispatch translation gateways.

* * * * *